(12) United States Patent
Chan et al.

(10) Patent No.: US 8,500,471 B1
(45) Date of Patent: Aug. 6, 2013

(54) CARD CONNECTOR

(75) Inventors: Ching-Jung Chan, New Taipei (TW); Ta-Chih Yu, New Taipei (TW)

(73) Assignee: Proconn Technology Co., Ltd., New Taipei (TW)

( * ) Notice: Subject to any disclaimer, the term of this patent is extended or adjusted under 35 U.S.C. 154(b) by 0 days.

(21) Appl. No.: 13/454,759

(22) Filed: Apr. 24, 2012

(51) Int. Cl.
*H01R 13/62* (2006.01)

(52) U.S. Cl.
USPC ............................................ 439/159; 439/630

(58) Field of Classification Search
USPC ......................................... 439/159, 630, 946
See application file for complete search history.

(56) References Cited

U.S. PATENT DOCUMENTS

| | | | | |
|---|---|---|---|---|
| 7,004,770 B2* | 2/2006 | Wu | | 439/159 |
| 7,229,300 B2* | 6/2007 | Lai et al. | | 439/159 |
| 7,393,221 B2* | 7/2008 | Feng et al. | | 439/159 |
| 7,614,890 B2* | 11/2009 | Lin | | 439/159 |
| 7,833,063 B2* | 11/2010 | Matsumoto et al. | | 439/630 |
| 8,038,477 B2* | 10/2011 | Zhang | | 439/630 |
| 8,353,727 B2* | 1/2013 | Katayanagi | | 439/630 |
| 2007/0105446 A1* | 5/2007 | Lai et al. | | 439/630 |

* cited by examiner

*Primary Examiner* — Neil Abrams
*Assistant Examiner* — Travis Chambers
(74) *Attorney, Agent, or Firm* — Muncy, Geissler, Olds & Lowe, PLLC

(57) ABSTRACT

A card connector includes an insulating housing defining a receiving chamber, and electrical terminals disposed in the insulating housing. A fool-proofing board has top edges of a front end thereof designed with slopes. Two lifting terminals are disposed in two sides of the receiving chamber with elastic portions thereof projecting upward in the receiving chamber to prop the fool-proofing board over the receiving chamber. Wherein the fool-proofing board can be pressed downward into the receiving chamber by a common SIM card under the guiding of the slopes, or move rearward under the drive of a micro SIM card of which a rear is inserted in the front end of the fool-proofing board. An ejection device is assembled in the insulating housing for ejecting the cards out of the card connector. A shielding shell is covered on the insulating housing.

9 Claims, 5 Drawing Sheets

CARD CONNECTOR

BACKGROUND OF THE INVENTION

1. Field of the Invention

The present invention relates to a card connector, and more particularly to a card connector capable of inserting two kinds of different cards therein.

2. The Related Art

Generally, a card connector is often assembled in a portable electronic product such as a mobile phone and a digital camera etc, so as to achieve some functions of the electronic product, such as data processing, data sharing and so on. With the development of diversifying the functions of the electronic products, SIM cards adapted for being inserted in the card connectors need different specifications and sizes to meet customer requirements and actual use demands, such as common SIM cards or micro SIM cards.

In order to make the electronic product capable of receiving the different specifications and sizes of SIM cards therein, a multi card connector came with the tide of fashion. Traditionally, the multi card connector often realizes the capability of receiving the common SIM card and the micro SIM card therein, by means of opening two different sizes of receiving chambers in an insulating housing of the multi card connector. In detail, the receiving chambers are apart opened in a top and a bottom of the insulating housing, or in a left side and a right side of the insulating housing, for receiving the common SIM card and the micro SIM card respectively. Furthermore, each receiving chamber has a group of electrical terminals arranged therein to connect with the corresponding SIM card.

However, because the electronic products develop towards the miniaturization direction more and more, but the above-mentioned multi card connector has too large volume and too complex structure to fail to meet the miniaturization requirement of the electronic product. Furthermore, it increases difficulty and cost of processing the electronic product. Therefore, a card connector capable of overcoming the foregoing problems is required.

SUMMARY OF THE INVENTION

An object of the present invention is to provide a card connector, which is adapted for receiving a common SIM card and a micro SIM card therein. The card connector includes an insulating housing which has a base board, two side walls and a blocking wall protruding upward from two opposite side edges and a rear edge of the base board respectively. A receiving space is surrounded among the base board, the side walls and the blocking wall. A substantial middle of a top side of the base board is concaved downward to form a receiving chamber. A plurality of terminals includes a plurality of electrical terminals disposed in the base board, and at least two lifting terminals located in two sides of a bottom wall of the receiving chamber. Each electrical terminal has a contact portion projecting upward into the receiving space and located in front of the receiving chamber. Each lifting terminal has at least one elastic portion projecting upward in the receiving chamber. A fool-proofing device includes a fool-proofing board having a shape in accordance with the receiving chamber and defining an inserting mouth in a substantial middle of a front end thereof. Top edges of other two parts of the front end of the fool-proofing board are cut off to form a pair of slopes. The fool-proofing board is movably located over the receiving chamber by virtue of the elastic portions of the lifting terminals elastically propping against a bottom thereof. An ejection device is assembled in one side wall of the insulating housing and has an ejection portion. The ejection portion stretches sideward in the receiving space to resist against a back of the fool-proofing board. A shielding shell is covered on the insulating housing to restrain the fool-proofing board between the shielding shell and the elastic portions of the lifting terminals.

In use, the common SIM card is inserted in the receiving space to electrically contact with the contact portions of the electrical terminals by virtue of pressing the fool-proofing board downward into the receiving chamber under the guiding of the slopes. A rear of the micro SIM card is inserted into the inserting mouth and then pushes the fool-proofing board to slide rearward in the receiving space so as to realize an electrical connection between the micro SIM card and the contact portions of the electrical terminals. The ejection portion of the ejection device resists against a back of the common SIM card after the fool-proofing board is pressed in the receiving chamber, or resists against the back of the fool-proofing board when the micro SIM card is inserted in the card connector, so as to eject the common SIM card out of the card connector directly or eject the micro SIM card out of the card connector by virtue of the fool-proofing board.

As described above, the fool-proofing board is movably located over the receiving chamber of the insulating housing by virtue of the elastic portions of the lifting terminals elastically propping against the bottom thereof. When the common SIM card is inserted into the card connector, the common SIM card presses the fool-proofing board downward into the receiving chamber under the guiding of the slopes. When the micro SIM card is inserted into the card connector, the rear of the micro SIM card is inserted in the inserting mouth and then pushes the fool-proofing board to slide rearward in the receiving space. So, the card connector of the present invention has a smaller volume and a simple structure to meet the miniaturization requirement and reduce the manufacture cost thereof.

BRIEF DESCRIPTION OF THE DRAWINGS

The present invention will be apparent to those skilled in the art by reading the following description with reference to the attached drawings, in which.

DETAILED DESCRIPTION OF THE PREFERRED EMBODIMENT

Figure 2:
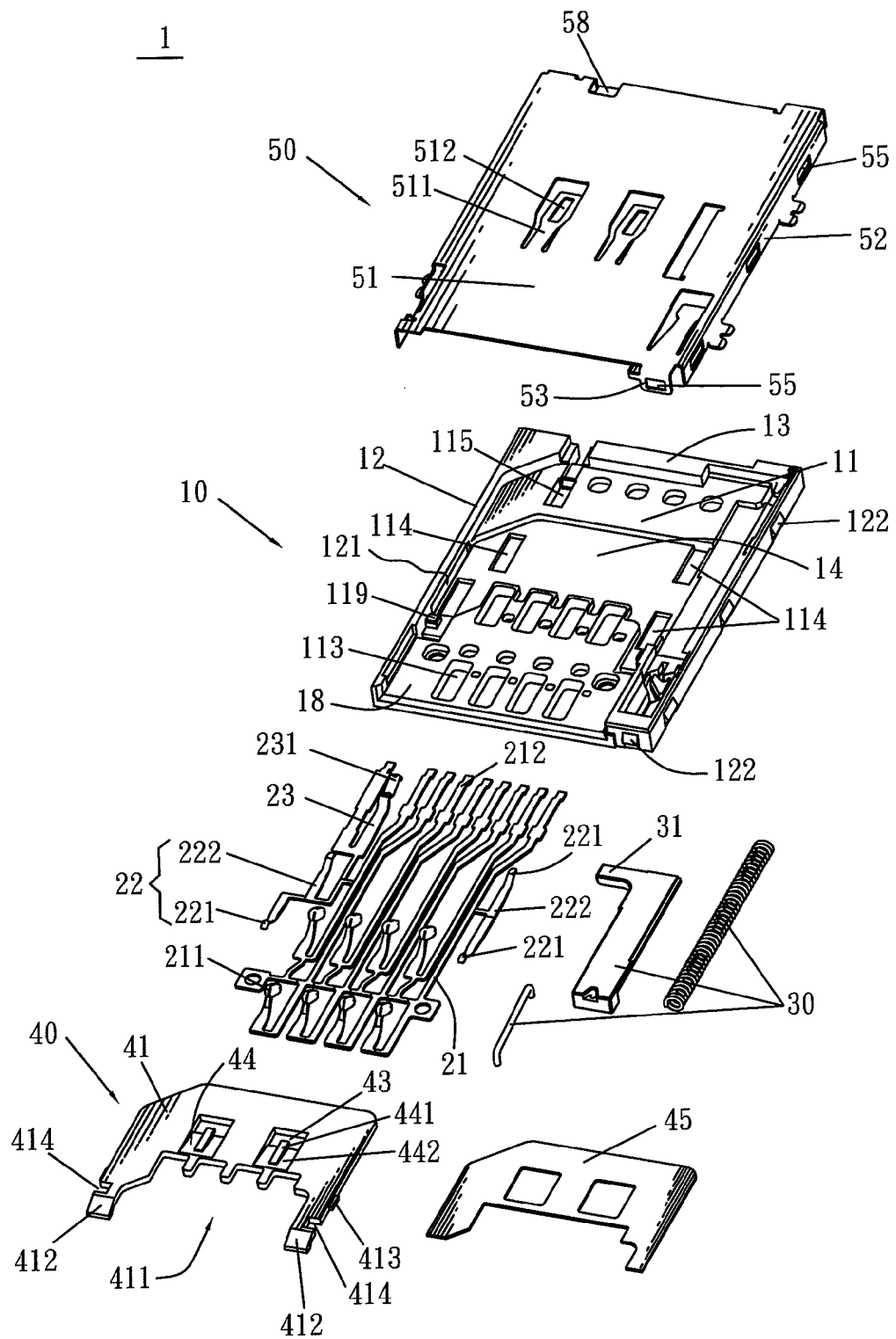
FIG. 2 is an exploded perspective view of the card connector of FIG. 1.
Figure 5:
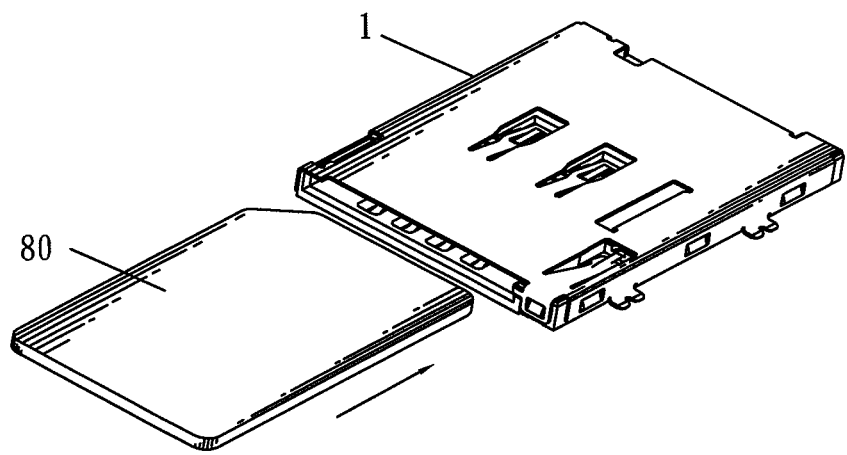
FIG. 5 is a use view of inserting a common SIM card into the card connector of FIG. 1.
Figure 6:
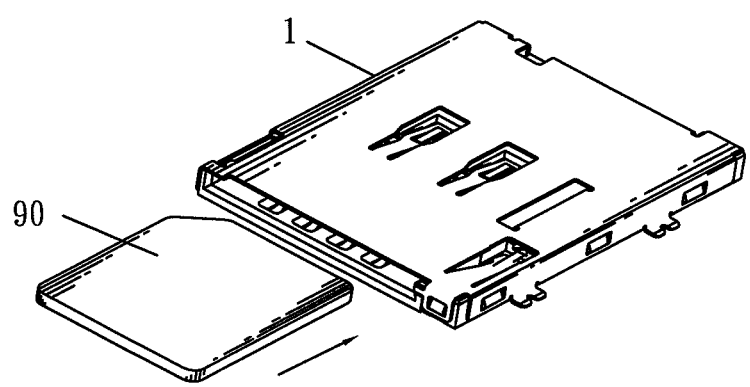
FIG. 6 is another use view of inserting a micro SIM card into the card connector of FIG. 1.

Referring to FIG. 2, FIG. 5 and FIG. 6, a card connector 1 according to an embodiment of the present invention is adapted for receiving a common SIM card 80 and a micro SIM card 90 therein. The card connector 1 includes an insulating housing 10, a plurality of terminals, an ejection device 30, a fool-proofing device 40 and a shielding shell 50. The terminals include a plurality of electrical terminals 21, at least two lifting terminals 22 and a monitoring terminal 23.

Figure 3:
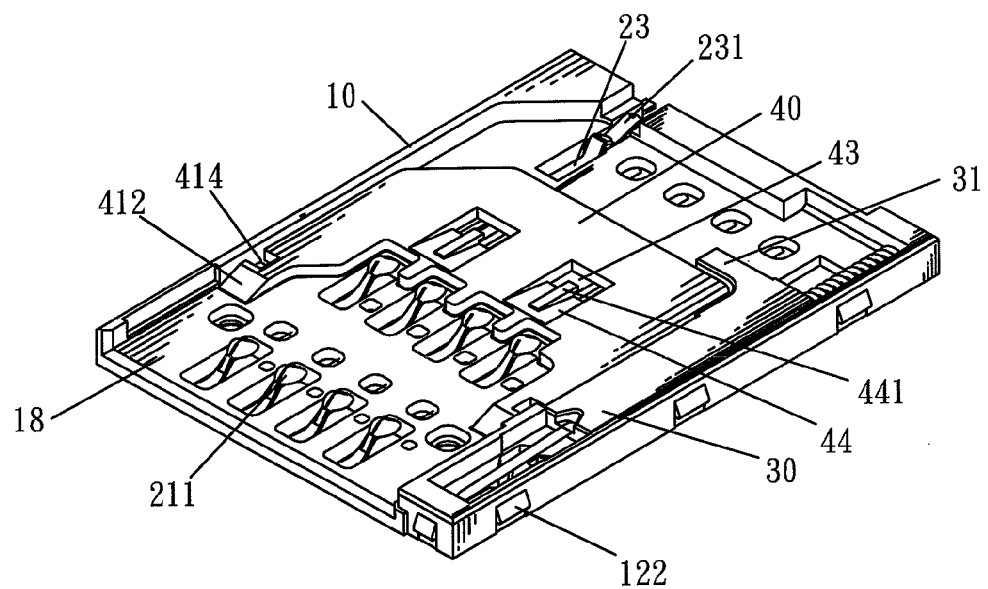
FIG. 3 is an assembled perspective view of the card connector of FIG. 1 excluding a shielding shell.

Referring to FIG. 2 and FIG. 3, the insulating housing 10 has a base board 11, two side walls 12 and a blocking wall 13 protruding upward from two opposite side edges and a rear edge of the base board 11 respectively. A receiving space 18 is surrounded among the base board 11, the side walls 12 and the blocking wall 13. A substantial middle of a top side of the base board 11 is further concaved downward to form a receiving chamber 14. The base board 11 defines a plurality of terminal fillisters 113 arranged in front of the receiving chamber 14 and a receiving groove 115 longitudinally located in rear of the receiving chamber 14. The terminal fillisters 113 and the receiving groove 115 communicate with the receiving space 18. The electrical terminals 21 and the monitoring terminal 23 are molded in the base board 11. Each electrical terminal 21 has a contact portion 211 which projects into the receiving space 18 through the corresponding terminal fillister 15, and a soldering tail 212 which stretches behind the blocking wall 13. The monitoring terminal 23 has a monitoring portion 231 elastically projecting upward into the receiving space 18 through the receiving groove 115.

Referring to FIGS. 2-3 again, the lifting terminals 22 are disposed in two sides of a bottom wall of the receiving chamber 14 of the insulating housing 10. Each lifting terminal 22 has at least one elastic portion 221 projecting upward in the receiving chamber 14. The fool-proofing device 40 includes a fool-proofing board 41 which has a shape in accordance with the receiving chamber 14 and defines an inserting mouth 411 in a substantial middle of a front end thereof. Top edges of other two parts of the front end of the fool-proofing board 41 are cut off to form a pair of slopes 412. The fool-proofing board 41 is movably located over the receiving chamber 14 by virtue of the elastic portions 221 of the lifting terminals 22 elastically propping against a bottom thereof. The ejection device 30 is assembled in one side wall 12 of the insulating housing 10 and further projects into the receiving space 18 for ejecting the cards 80, 90 out of the card connector 1. The shielding shell 50 is covered on the insulating housing 10 to restrain the fool-proofing board 41 between the shielding shell 50 and the elastic portions 221 of the lifting terminals 22.

Referring to FIG. 3, FIG. 5 and FIG. 6, in use, the common SIM card 80 is inserted rearward in the receiving space 18 of the insulating housing 10 to electrically contact with the contact portions 211 of the electrical terminals 21 by virtue of pressing the fool-proofing board 41 downward into the receiving chamber 14 under the guiding of the slopes 412. After the fool-proofing board 41 is completely pressed in the receiving chamber 14, the common SIM card 80 pushes the ejection device 30 rearward to complete the insertion action thereof, and further presses the monitoring portion 231 of the monitoring terminal 23 downward to monitor insertion states thereof. When using the micro SIM card 90 in the card connector 1, a rear of the micro SIM card 90 is inserted rearward into the inserting mouth 411 and further pushes the fool-proofing board 41 to slide rearward in the receiving space 18 so as to realize an electrical connection between the micro SIM card 90 and the contact portions 211 of the electrical terminals 21. In this period, the fool-proofing board 41 further pushes the ejection device 30 rearward by virtue of the drive of the micro SIM card 90, and presses the monitoring portion 231 of the monitoring terminal 23 downward so as to monitor insertion states of the micro SIM card 90. The fool-proofing board 41 can move back over the receiving chamber 14 under the ejection action of the ejection device 30 to further eject the micro SIM card 90 out of the card connector 1.

Figure 1:
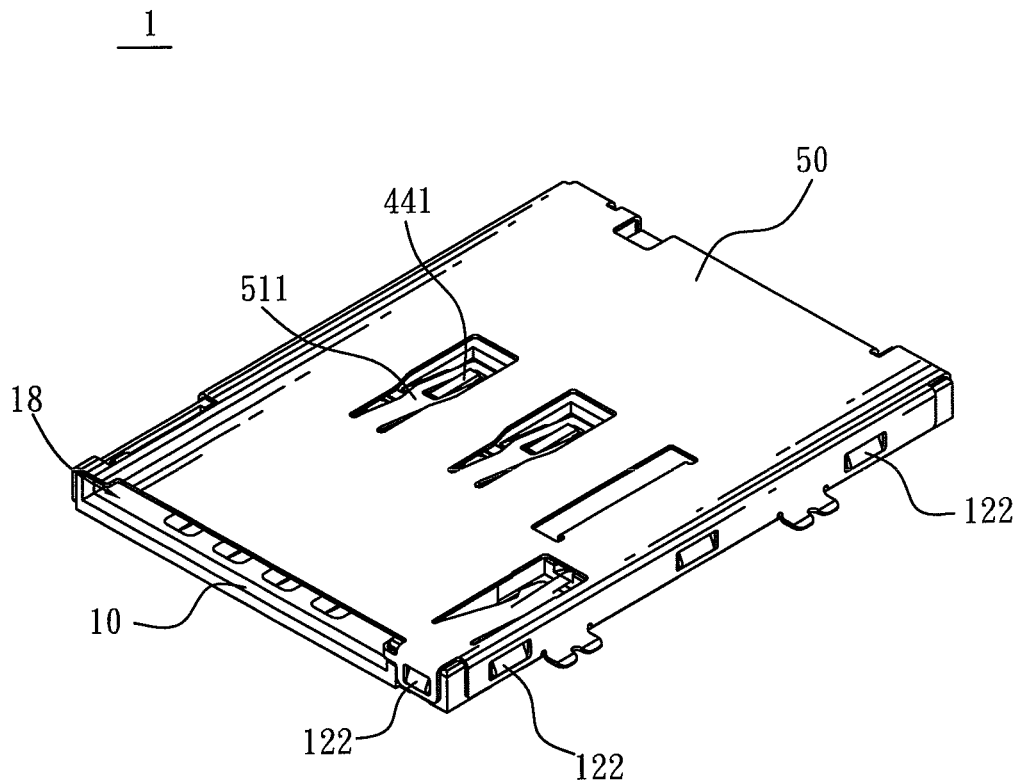
FIG. 1 is an assembled perspective view of a card connector in accordance with an embodiment of the present invention.
Figure 4:
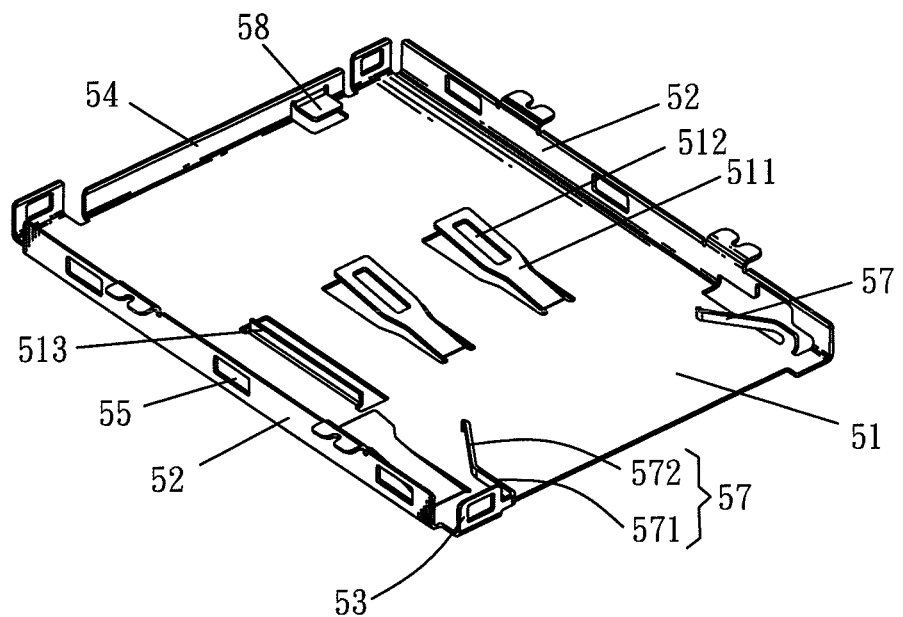
FIG. 4 is a perspective view of the shielding shell of the card connector of FIG. 2.

Referring to FIG. 1, FIG. 2 and FIG. 4, the receiving chamber 14 of the insulating housing 10 adjoins two face-to-face inner sides of the side walls 12. The inner side of the other side wall 12 defines a positioning slot 121 extending a front-to-rear direction thereof and connecting with one side of the receiving chamber 14 opposite to the ejection device 30. The shielding shell 50 has a top plate 51 covered on the insulating housing 10. One side of the top plate 51 close to the ejection device 30 is die-cut downward to form a vertical and longitudinal positioning plate 513. Two opposite side edges of the fool-proofing board 41 oppositely protrude sideward to form a pair of positioning ears 413 of which one is located in the positioning slot 121 of the insulating housing 10 and the other is restricted under the positioning plate 513 of the shielding shell 50 so that assures up-and-down and back-and-forth movements of the fool-proofing board 41.

Referring to FIGS. 1-6, a pair of openings 43 is opened in the fool-proofing board 41 and transversely arranged behind the inserting mouth 411. A front sidewall of each opening 43 protrudes rearward to form a supporting block 44 with a top face 442 thereof inclining downward from front to rear. A buckling rib 441 protrudes upward from a middle of the top face 442 of the supporting block 44 and extends longitudinally to further project rearward into the opening 43. The top plate 51 of the shielding shell 50 is die-cut downward to form a pair of buckling slices 511 slanting against the top faces 442 of the supporting blocks 44 respectively. Each of the buckling slices 511 defines a buckling hole 512. The buckling rib 441 stretches in the corresponding buckling hole 512 and is adapted for buckling with the buckling hole 512 to avoid mis-inserting the cards 80, 90 in the card connector 1. In detail, in the process of inserting the common SIM card 80 into the card connector 1, the common SIM card 80 props the buckling slices 511 upward to separate the buckling ribs 441 from the buckling holes 512, and presses the fool-proofing board 41 downward to slide onto the fool-proofing board 41 under the guiding of the slopes 412. In the process of inserting the micro SIM card 90 into the card connector 1, the rear of the micro SIM card 90 is inserted in the inserting mouth 411 to push rearward the fool-proofing board 41. In the meanwhile, the micro SIM card 90 props the buckling slices 511 upward to separate the buckling ribs 441 from the buckling holes 512, then the fool-proofing board 41 further pushes the ejection device 30 rearward by virtue of the drive of the micro SIM card 90 so as to complete the insertion action of the micro SIM card 90.

A pair of positioning bumps 119 protrudes on the two sides of the bottom wall of the receiving chamber 14 of the insulating housing 10. The two opposite side edges of the fool-proofing board 41 define two positioning gaps 414 for holding the positioning bumps 119 therein so as to position the fool-proofing board 41 in the receiving chamber 14 of the insulating housing 10 when the fool-proofing board 41 is pressed downward in the receiving chamber 14 by the common SIM card 80. The fool-proofing device 40 further includes a strengthening plate 45 made of solid metal material and integrated in the fool-proofing board 41 to strengthen the strength of the fool-proofing board 41. The lifting terminal 22 has a fastening portion 222 of a substantially long strip shape. Two free ends of the fastening portion 222 are curved upward to form a pair of the elastic portions 221. The fastening portions 222 of the lifting terminals 22 are molded in the base board 11 of the insulating housing 10. The two sides of the bottom wall of the receiving chamber 14 respectively define a pair of receiving fillisters 114 for receiving the corresponding elastic portions 221 of the lifting terminal 22 therein when the fool-proofing board 41 is pressed in the receiving chamber 14.

Referring to FIGS. 1-6 again, the ejection device 30 has an ejection portion 31 stretching sideward in the receiving space 18 of the insulating housing 10. The ejection portion 31 resists against a back of the fool-proofing board 41 or a back of the common SIM card 80 so as to eject the micro SIM card 90 out of the card connector 1 by virtue of the fool-proofing board 41 or eject the common SIM card 80 out of the card connector 1 directly. The shielding shell 50 further has two side plates 52 extending downward from two opposite side edges of the top plate 51 to abut against two opposite outer sides of the side walls 12 of the insulating housing 10. A front edge of the one side of the top plate 51 protrudes downward to form a holding plate 53 resisting against a front end of the one side wall 12. The two opposite outer sides of the side walls 12 and the front end of the one side wall 12 of the insulating housing 10 protrude outward to form a plurality of fastening blocks 122. A plurality of fastening holes 55 is opened in the side plates 52 and the holding plate 53 for buckling the corresponding fastening blocks 122 therein so as to secure the shielding shell 50 and the insulating housing 10 together.

The shielding shell 50 further has two restraining members 57 of which each has a base strip 571 and an elastic arm 572 extending rearward from a rear end of the base strip 571 and inclined inward to stretch into the receiving space 18 of the insulating housing 10. A front end of the base strip 571 of one restraining member 57 is connected with a side edge of the holding plate 53, and a top edge of the base strip 571 of the other restraining member 57 is connected with a front of the other side of the top plate 51. In the process of inserting the common SIM card 80 and the micro SIM card 90 into the card connector 1, the elastic arms 572 of the restraining members 57 resist against two opposite side edges of the cards 80, 90 to guide the movement of the cards 80, 90 along the normal track, especially guide the micro SIM card 90 to be smoothly inserted into the inserting mouth 411 of the fool-proofing board 41. A rear edge of the top plate 51 of the shielding shell 50 extends downward to form a rear plate 54 abutting against the blocking wall 13 of the insulating housing 10. A joint of the rear plate 54 and the top plate 51 is die-cut inward to form a restraining slice 58 located over a rear of the receiving groove 115 for restraining a springback height of the monitoring portion 231 of the monitoring terminal 23.

As described above, the fool-proofing board 41 is movably located over the receiving chamber 14 of the insulating housing 10 by virtue of the elastic portions 221 of the lifting terminals 22 elastically propping against the bottom thereof. When the common SIM card 80 is inserted into the card connector 1, the common SIM card 80 presses the fool-proofing board 41 downward into the receiving chamber 14 under the guiding of the slopes 412. When the micro SIM card 90 is inserted into the card connector 1, the rear of the micro SIM card 90 is inserted in the inserting mouth 411 and then pushes the fool-proofing board 41 to slide rearward in the receiving space 18. So, the card connector 1 of the present invention has a smaller volume and a simple structure to meet the miniaturization requirement and reduce the manufacture cost thereof.

What is claimed is:

1. A card connector adapted for receiving a common SIM card and a micro SIM card therein, comprising:
    an insulating housing having a base board, two side walls and a blocking wall protruding upward from two opposite side edges and a rear edge of the base board respectively, a receiving space being surrounded among the base board, the side walls and the blocking wall, a substantial middle of a top side of the base board being concaved downward to form a receiving chamber;
    a plurality of terminals including a plurality of electrical terminals disposed in the base board and at least two lifting terminals located in two sides of a bottom wall of the receiving chamber, each electrical terminal having a contact portion projecting upward into the receiving space and located in front of the receiving chamber, each lifting terminal having at least one elastic portion projecting upward in the receiving chamber;
    a fool-proofing device including a fool-proofing board having a shape in accordance with the receiving chamber and defining an inserting mouth in a substantial middle of a front end thereof, top edges of other two parts of the front end of the fool-proofing board being cut off to form a pair of slopes, the fool-proofing board being movably located over the receiving chamber by virtue of the elastic portions of the lifting terminals elastically propping against a bottom thereof;
    an ejection device assembled in one side wall of the insulating housing and having an ejection portion, the ejection portion stretching sideward in the receiving space to resist against a back of the fool-proofing board; and
    a shielding shell covered on the insulating housing to restrain the fool-proofing board between the shielding shell and the elastic portions of the lifting terminals,
    wherein the common SIM card is inserted in the receiving space to electrically contact with the contact portions of the electrical terminals by virtue of pressing the fool-proofing board downward into the receiving chamber under the guiding of the slopes, a rear of the micro SIM card is inserted into the inserting mouth and then pushes the fool-proofing board to slide rearward in the receiving space so as to realize an electrical connection between the micro SIM card and the contact portions of the electrical terminals, the ejection portion of the ejection device resists against a back of the common SIM card after the fool-proofing board is pressed in the receiving chamber, or resists against the back of the fool-proofing board when the micro SIM card is inserted in the card connector, so as to eject the common SIM card out of the card connector directly or eject the micro SIM card out of the card connector by virtue of the fool-proofing board.

2. The card connector as claimed in claim 1, wherein the fool-proofing device further includes a strengthening plate made of solid metal material and integrated in the fool-proofing board to strengthen the strength of the fool-proofing board.

3. The card connector as claimed in claim 1, wherein the lifting terminal has a fastening portion of a substantially long strip shape, and two free ends thereof are curved upward to form a pair of the elastic portions, the fastening portions are molded in the base board, the two sides of the bottom wall of the receiving chamber respectively define a pair of receiving fillisters for receiving the corresponding elastic portions therein when the fool-proofing board is pressed in the receiving chamber.

4. The card connector as claimed in claim 1, wherein the shielding shell has a top plate covered on the insulating housing, and two side plates extending downward from two opposite side edges of the top plate to abut against two opposite outer sides of the side walls, a front edge of one side of the top plate protrudes downward to form a holding plate resisting against a front end of the one side wall of the insulating housing, the two opposite outer sides of the side walls and the front end of the one side wall protrude outward to form a plurality of fastening blocks, a plurality of fastening holes is opened in the side plates and the holding plate for buckling the corresponding fastening blocks therein.

5. The card connector as claimed in claim 1, wherein the receiving chamber adjoins two face-to-face inner sides of the side walls, the inner side of the other side wall defines a positioning slot extending a front-to-rear direction thereof and connecting with one side of the receiving chamber opposite to the ejection device, the shielding shell has a top plate covered on the insulating housing, one side of the top plate close to the ejection device is die-cut downward to form a vertical and longitudinal positioning plate, two opposite side edges of the fool-proofing board oppositely protrude sideward to form a pair of positioning ears of which one is located in the positioning slot of the insulating housing and the other is restricted under the positioning plate so that assures up-and-down and back-and-forth movements of the fool-proofing board.

6. The card connector as claimed in claim 5, wherein a pair of openings is opened in the fool-proofing board and transversely arranged behind the inserting mouth, a front sidewall of each opening protrudes rearward to form a supporting block with a top face thereof inclining downward from front to rear, a buckling rib protrudes upward from a middle of the top face of the supporting block and extends longitudinally to further project rearward into the opening, the top plate of the shielding shell is die-cut downward to form a pair of buckling slices slanting against the top faces of the supporting blocks respectively, each of the buckling slices defines a buckling hole, the buckling rib stretches in the corresponding buckling hole and is adapted for buckling with the buckling hole to avoid mis-inserting the cards in the card connector.

7. The card connector as claimed in claim 6, wherein a pair of positioning bumps protrudes on the two sides of the bottom wall of the receiving chamber, the two opposite side edges of the fool-proofing board define two positioning gaps for holding the positioning bumps therein so as to position the fool-proofing board in the receiving chamber when the fool-proofing board is pressed downward in the receiving chamber by the common SIM card.

8. The card connector as claimed in claim 1, wherein the terminals further include a monitoring terminal molded in the base board of the insulating housing, the monitoring terminal has a monitoring portion elastically projecting upward into the receiving space and located in rear of the receiving chamber, the monitoring portion of the monitoring terminal can be pressed downward by the common SIM card or the fool-proofing board so as to monitor insertion states of the common SIM card or the micro SIM card in the card connector.

9. The card connector as claimed in claim 8, wherein the shielding shell has a top plate of which a rear edge extends downward to form a rear plate abutting against the blocking wall of the insulating housing, a joint of the rear plate and the top plate is die-cut inward to form a restraining slice located over a free end of the monitoring portion of the monitoring terminal to restrain a springback height of the monitoring portion.

* * * * *